R. H. MILLER.
GLASS FURNACE.
APPLICATION FILED APR. 11, 1912.

1,104,375.

Patented July 21, 1914.

Attest:
H. G. Fletcher.
M. C. Hammon.

Inventor:
Robert H. Miller.
By Sheridan, Wilkinson, Scott and Richmond
Attys.

R. H. MILLER.
GLASS FURNACE.
APPLICATION FILED APR. 11, 1912.

1,104,375.

Patented July 21, 1914.

R. H. MILLER.
GLASS FURNACE.
APPLICATION FILED APR. 11, 1912.

1,104,375.

Patented July 21, 1914.
7 SHEETS—SHEET 5.

Inventor:
Robert H. Miller.

R. H. MILLER.
GLASS FURNACE.
APPLICATION FILED APR. 11, 1912.

1,104,375.

Patented July 21, 1914.
7 SHEETS—SHEET 7.

Fig. 12  Fig. 14  Fig. 11  Fig. 13

Attest:
C. C. Burnap
Henry A. Parks

Inventor:
Robert H. Miller
By Sheridan, Wilkinson, Scott & Richmond Attys.

UNITED STATES PATENT OFFICE.

ROBERT H. MILLER, OF ST. LOUIS, MISSOURI, ASSIGNOR TO LACLEDE-CHRISTY CLAY PRODUCTS COMPANY, OF ST. LOUIS, MISSOURI, A CORPORATION OF MISSOURI.

GLASS-FURNACE.

1,104,375.  Specification of Letters Patent. Patented July 21, 1914.

Application filed April 11, 1912. Serial No. 690,137.

*To all whom it may concern:*

Be it known that I, ROBERT H. MILLER, a citizen of the United States, residing at the city of St. Louis, State of Missouri, have invented certain new and useful Improvements in Glass-Furnaces, of which the following is a specification.

This invention relates more especially to pot furnaces for glass, and has for its main general object to provide an improved construction, combination and arrangement of parts in furnaces of this character by means of which the temperature can be maintained substantially uniform throughout the interior of furnace chambers of great length.

Toward the attainment of this object, my invention contemplates a steady fire from both ends simultaneously, the heating currents being caused to discharge downwardly adjacent the center of the furnace. By means of this construction, certain objectionable features, which are encountered in the regenerative or reversing furnaces, are obviated entirely, such as the loss of heat and gas in the reversals.

Furthermore, my invention overcomes certain objectionable features of those types of regenerative furnaces in which the gases are caused to travel continuously in one direction or another over a hearth of extended length, with the result that the temperature and working conditions were not uniform throughout. To overcome this objection, the present invention contemplates a steady fire from both ends toward the center, and a downward discharge which draws the fire down about the pots instead of permitting it to travel along the roof, as happens in the long furnaces in which the fire travels the entire length of the hearth in one direction only. In consequence, a lower cost of melting, as well as a reduction of time, results.

One of the objects of the present invention is to provide an improved recuperator construction, according to which the products of combustion are caused to travel at a relatively slow velocity when at their highest temperature, whereby the maximum of recuperative efficiency can be obtained. By this means, the gas and air are raised to the highest possible temperature just prior to entering the furnace hearth.

Another object is to provide an improved disposition of the recuperating elements according to which the flow of air therethrough is baffled to increase the heating effects, and the flow of the fuel gas is facilitated to prevent the deposit of solid carbonaceous elements carried in suspension by the inflowing gas.

A more specific object is to provide an improved construction according to which the recuperator portions of the furnace can be readily cleaned and made accessible for repairs.

Other and further objects will appear in the specification, and be more specifically pointed out in the appended claims, reference being had to the accompanying drawings exemplifying the invention, and in which—

In the adaptation of my invention shown in the drawings, the combustion chamber 1 is of great length compared to its width, the furnace being thereby adapted to receive a relatively large number of glass melting pots, and to have said pots arranged in positions wherein they will all receive approximately the same amount of heat under the uniform conditions created by the construction and arrangement of parts to be hereinafter fully described.

In connection with a recuperator of peculiar construction to be hereinafter pointed out, I am enabled to embody a hearth of great relative length by providing a down draft discharge outlet 2 at the longitudinal center of said hearth, thus adapting the fuel gas to be introduced at both ends simultaneously to flow in counter currents toward the center of the furnace, a construction which not only reduces the length of the flames to less than one-half of what they would be did they pass the full length of the hearth; but, by reason of this construction, the flames are caused to travel closer to the bed 3 of the hearth, with the result that the glass pots resting thereon are heated more rapidly and uniformly.

Figure 8:
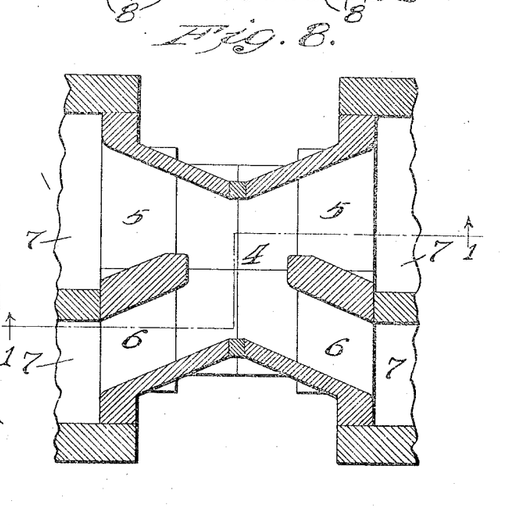
Fig. 8 is a fragmentary section on the line VIII—VIII, Fig. 1.

The products of combustion discharging downwardly through the outlet 2 enter a chamber 4 which, as shown in Fig. 8, branches off into galleries 5 leading to the air recuperators, and galleries 6 leading to the gas recuperators. From the galleries 5 and 6, these products of combustion are conveyed through vertical shafts 7 to horizontally disposed channels 8 which extend longitudinally of the hearth from said shafts 7 to vertical shafts 9 which, in turn, convey said products to a series of horizontally disposed return channels 10 through which the gases pass on their way to outlet chambers 11 and 12, respectively, one of said chambers receiving the products from the gas recuperating section 13, and the other receiving the products from the air recuperating section 14 (see Fig. 5).

The chambers 11 and 12 discharge into the flue 15 leading to the stack, the discharge from the chamber 11 being controlled by a damper 16, and the discharge from the chamber 12 being controlled by a damper 17, these dampers providing means for modifying the velocities of the products of combustion flowing from the gas and air sections, respectively. As a result, the temperature in these sections can be regulated, thus permitting the furnace to be controlled more efficiently.

Figure 1:
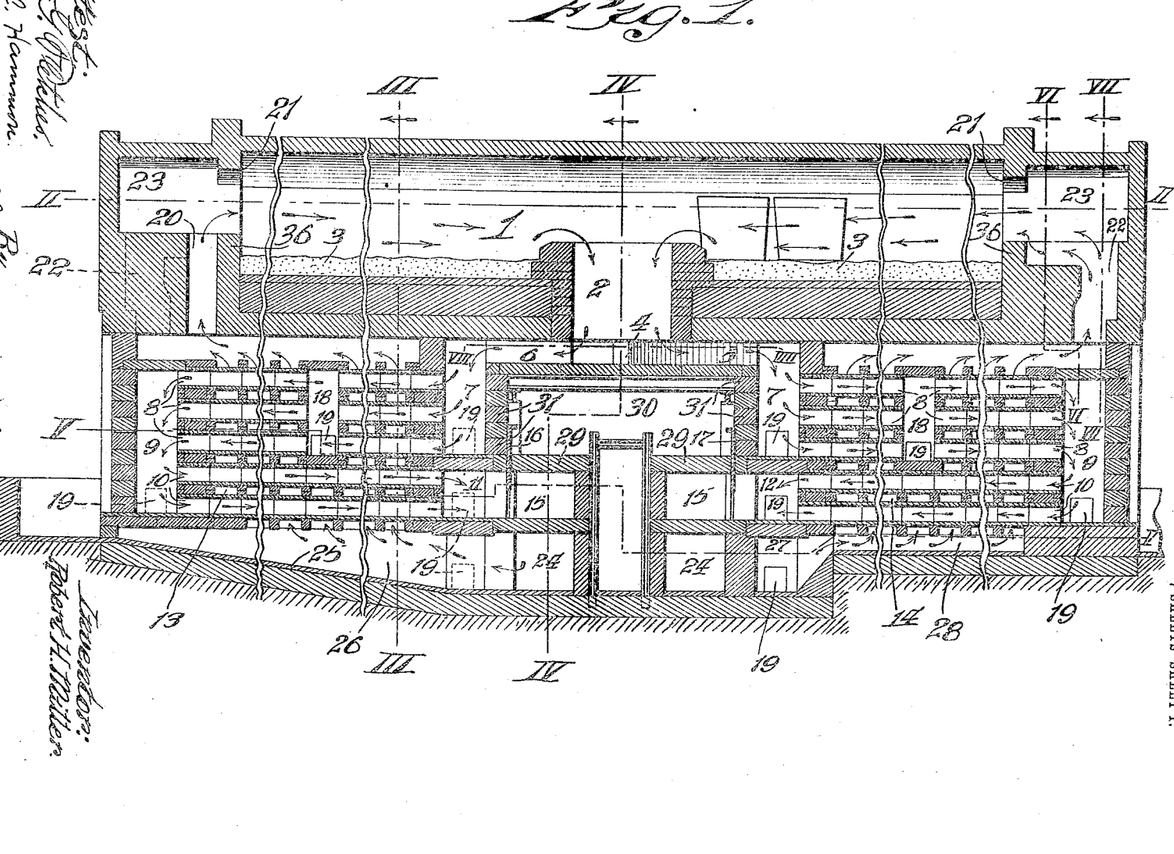
Figure 1 is a vertical longitudinal section along the line I—I of Fig. 2 and along the line 1—1 of Fig. 8 of a pot glass furnace constructed in accordance with the principles of the present invention.
Figure 2:
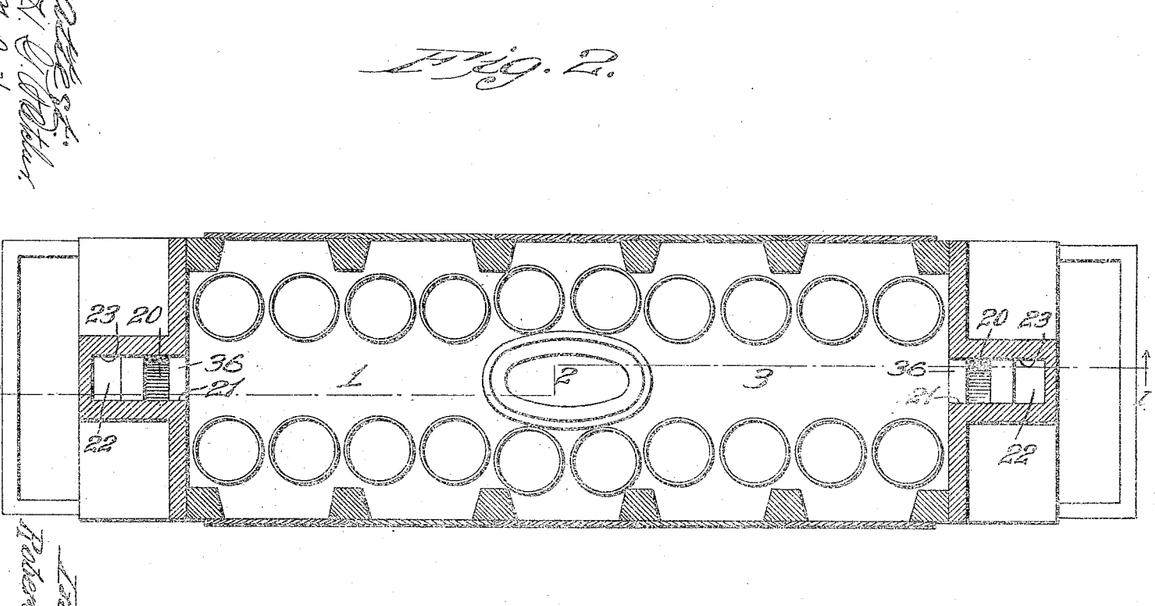
Fig. 2 is a horizontal section on line II—II, Fig. 1.
Figure 5:
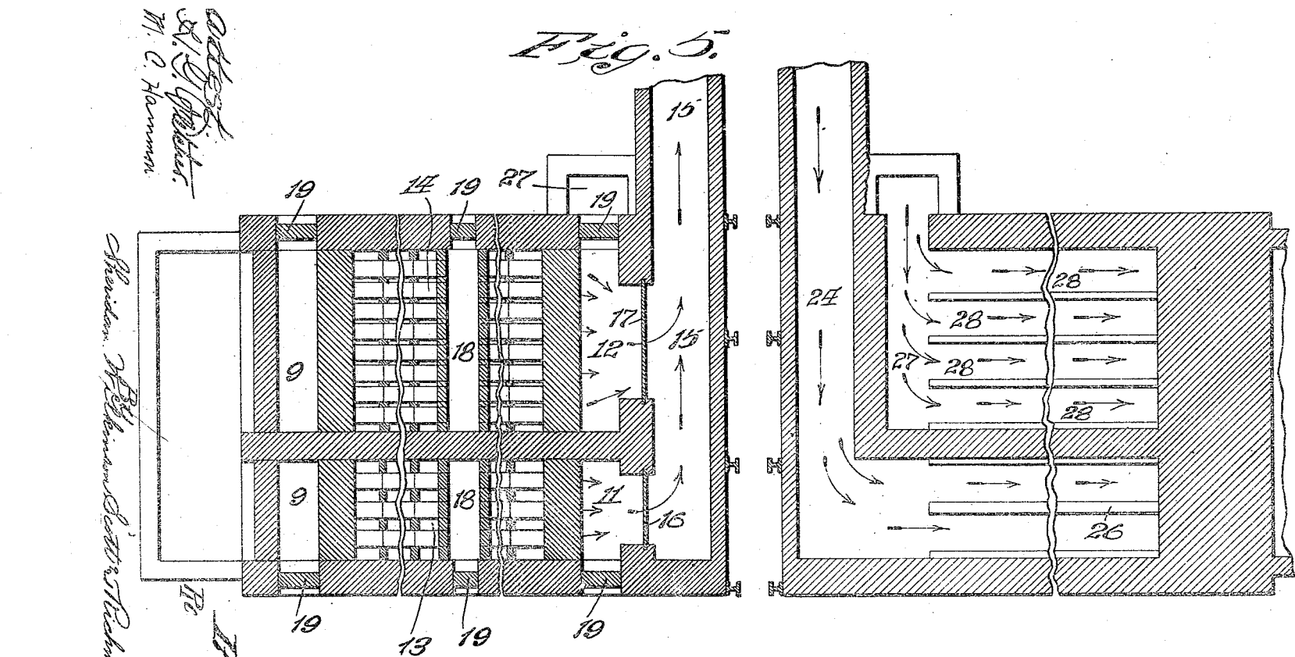
Fig. 5 is a horizontal section on the broken line V—V, Fig. 1.

As shown best in Figs. 1 and 5, the recuperators at each end of the furnace are provided with shafts 18 which cut all of the channels 8 vertically, these shafts being adapted to receive the cleanings from the channels 8 which may be scraped thereinto by an operator working in the shafts 7, or in the shafts 9. To enable such operator to gain access to the shafts 7, 9 and 18, I provide removable flared blocks 19.

Referring now more especially to Fig. 1, it will be noted that the products of combustion, as they leave the shafts 7, are permitting a much greater cross sectional area through which to flow than is the case when they enter the channels 10 on their return toward the stack. This feature of my device insures, in a simple and efficient manner, that the products of combustion, when at their highest heating efficiency, will pass with relatively slow velocity through the recuperators, the air and gas being passed around said channels in such manner as to strike these hottest portions just prior to entering the furnace hearth.

The embodiment of the shafts 18 in the recuperator construction is of great assistance in maintaining the channels 8 in good operating condition by making the parts more accessible, so that the increased deposits which take place by reason of the reduced velocity at this point are easily and conveniently removed. Said shafts 18 are moreover of great utility in making the interior of the recuperator accessible for repairs and the like.

Figure 3:
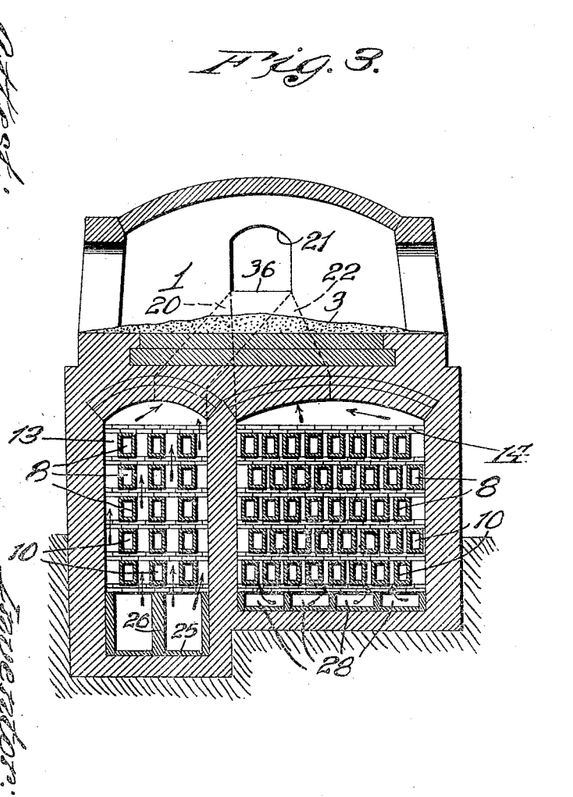
Fig. 3 is a section on the line III—III, Fig. 1.
Figure 4:
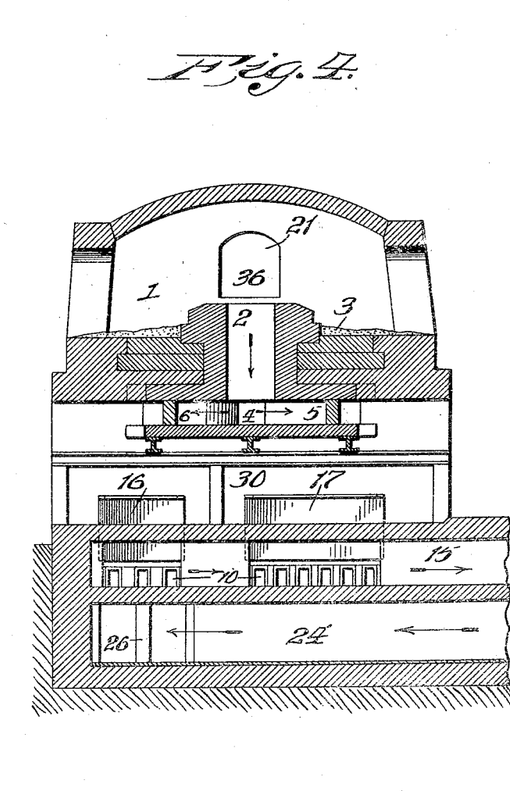
Fig. 4 is a vertical transverse section on the line IV—IV, Fig. 1.

Referring now to Fig. 3 of the drawings, it will be noted that the air recuperator section 14 comprises a large number of hollow tiles which are arranged in staggered relation so as to baffle the passage of the air therethrough for increasing the heating efficiency; the increased resistance offered to the passage of the air by this construction being offset by constructing the air section of relatively great cross sectional area in comparison to the cross sectional area of the gas recuperating section 13. In the gas recuperating section, the hollow tiles are spaced at greater distances, and in alinement in vertical series, so as to afford straight passageways therethrough; the purpose of this arrangement being to obviate, as far as possible, all deposits of carbon from the gases passing therethrough.

Figure 6:
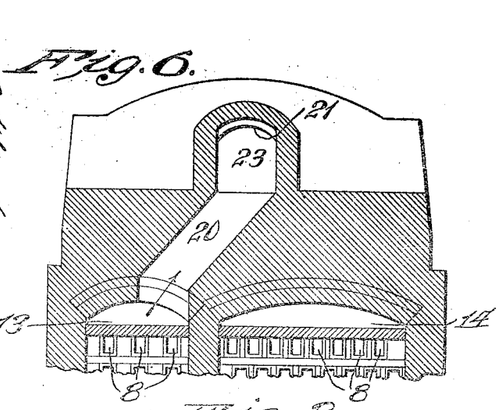
Fig. 6 is a fragmentary section on the line VI—VI, Fig. 1.
Figure 7:
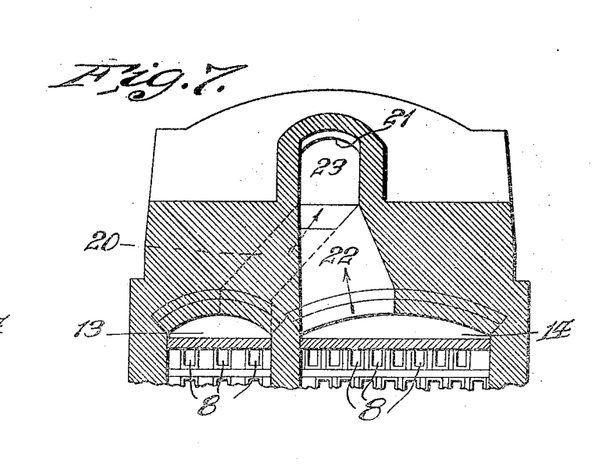
Fig. 7 is a fragmentary section on the line VII—VII, Fig. 1.

As shown in Fig. 6, the gas upon leaving its regenerator enters an upwardly inclined passageway 20 which leads to the vertical inlet 21 of the furnace. The air section of the recuperator, on the other hand, discharges upwardly through the gallery 22 which, as indicated by dotted lines in Fig. 1, merges into the gas duct 20 near the upper end thereof, so that the air and gas are mixed prior to their discharge into the furnace, the mixing chambers 23 facilitating this action.

Referring now to Figs. 1 and 5, the gas is admitted to the recuperators on either side, preferably through a duct 24 immediately below the duct 15 leading to the stack, the floor 25 of the said gallery of the recuperator being inclined upwardly to aid in deflecting the gases toward the recuperator. In order to distribute the gas more uniformly over the recuperator, the partition 26 separates the gas into two bodies which move upwardly through the recuperator with comparatively small resistance, the reduced heating contact provided by this construction being compensated for by the heat which is usually present in gases received from the producer in furnaces of this nature.

The air conduit 27 (see Fig. 5) is, in the present embodiment of my invention, divided into four galleries 28 which lead from the conduit 27 at a right angle thereto and discharge into the air section 14 of the recuperator on either end. The top walls 29 of the chimney ducts 15 form the footways of a transverse gallery 30 which extends through the furnace beneath the discharge outlet 2. The gallery 30 gives access to the interior of the recuperators by the removal of one or more of the blocks 31 which constitute the inner transverse walls of said recuperators.

Figure 9:
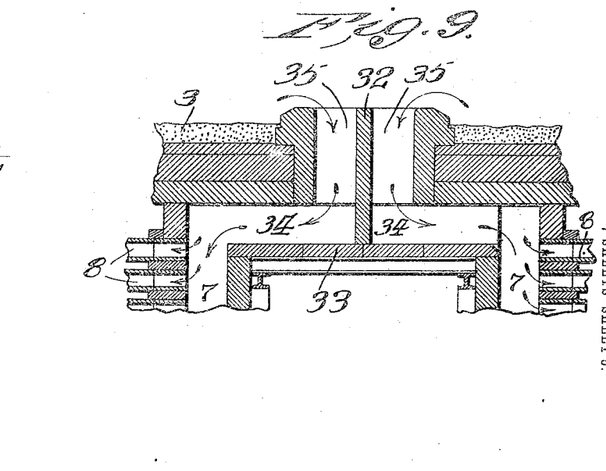
Fig. 9 is a fragmentary vertical longitudinal section of a modified construction of the down-draft discharge outlet.

In the modified construction of the discharge outlet shown in Fig. 9, I provide a central transverse partition wall 32 which projects upwardly from the floor 33 of the discharge chambers 34, this construction providing separate discharge outlets 35, one for the gases traveling from each end of the furnace.

Figure 10:
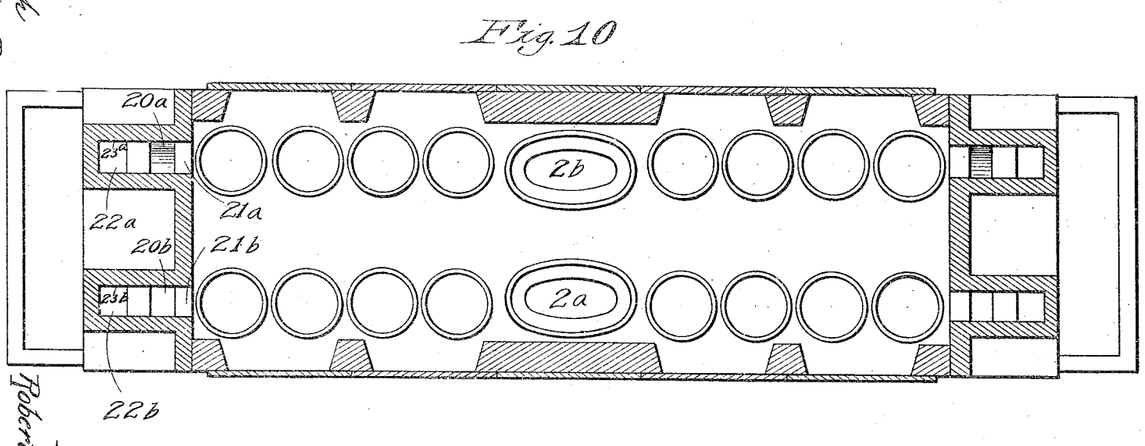
Fig. 10 is a view similar to Fig. 2 of a modification.
Figure 11:
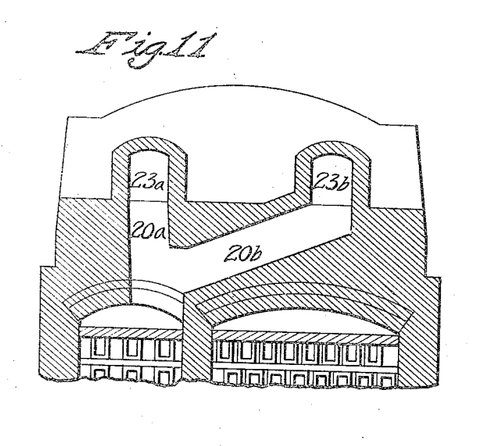
Fig. 11 is a transverse vertical sectional view through the gas inlets of the modification shown in Fig. 10.
Figure 12:
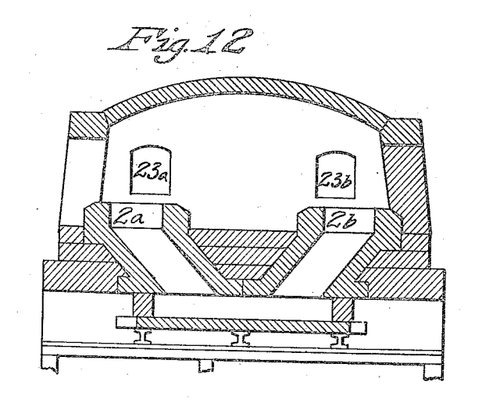
Fig. 12 is a similar view through the outlets.
Figure 13:
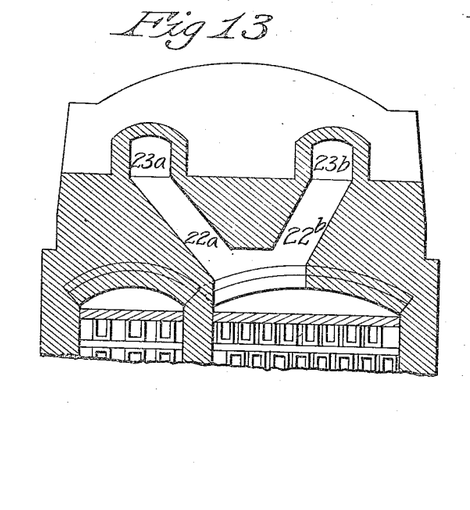
Fig. 13 is a similar view through the air inlets.

In Figs. 10 to 14 I have shown a slightly modified form of furnace, in which I provide a pair of outlets $2^a$ and $2^b$, respectively, at each side of the furnace as shown in Fig. 10. I also provide at each end of the furnace a pair of gas inlets $20^a$ and $20^b$ leading to mixing chambers $23^a$ and $23^b$, respectively. Located adjacent to the passages $20^a$ and $20^b$ are the air inlets $22^a$ and $22^b$ also leading to the respective mixing chambers $23^a$ and $23^b$ and intersecting the corresponding gas inlets adjacent their top.

Figure 14:
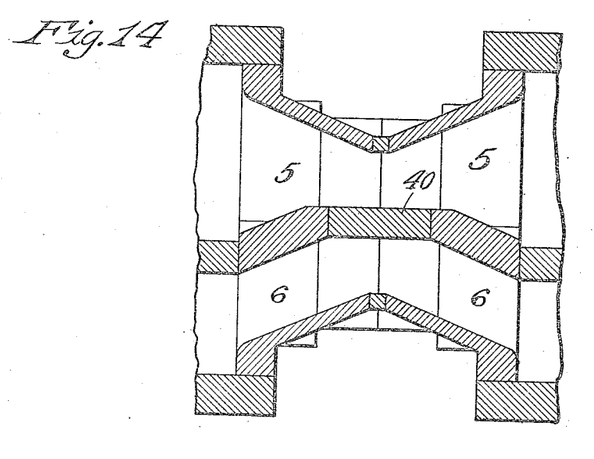
Fig. 14 is a horizontal section along the line 14—14 of Fig. 12.

A partition member 40 may be placed as shown in Fig. 14 to entirely separate passages 5 from passages 6.

The operation of the furnace is obvious from the description heretofore given, and briefly stated, is as follows: The gas introduced on either side through the intake 24 discharges into the parallel galleries on either side of the partition 26, and from thence upwardly through the recuperator section 13 in which it is raised to the desired temperature prior to its intermixture with the air in the mixing chambers 23. The air, on the other hand, entering through the conduits 27 passes into the galleries 28 and upwardly through the sections 14 of the recuperator, and thence through the passageway 22 into the mixing chamber, its direct course into the furnace hearth leading directly across the upper end of the passageway 20, through which the gas discharges upwardly.

Passing from the bridge wall 36, the intermixed gases and air are consumed in the hearth of the furnace; and during combustion, by reason of the inward travel over but one-half of the length of the hearth, and by reason of the position of the discharge outlet 2, are caused to envelop the glass melting pots within the furnace in a heat which is substantially uniform throughout the furnace hearth, the result being that a better product is secured, the time in the heat is reduced, and the life of the pots is increased, since the stresses created by unequal heating and cooling are done away with.

The products of combustion discharging downwardly through the opening 2 are divided in the chamber 4 into four parts in the manner already indicated, and by having a larger number of channels 8 in the upper portion of the recuperator section than are embodied in the lower section thereof, the highly heated products are caused to travel relatively slowly so that their heating efficiency is raised to the maximum. Furthermore, said products as they cool are reduced in volume and hence are better accommodated, for this reason, in the lower channels 10. The higher velocity in these lower channels tends to reduce the amount of deposits therein.

By manipulating the damper gates 16 and 17, which control the discharge of the products of combustion into the chimney ducts 15 from the gas and air sections, respectively, it will be readily appreciated that the relative velocities and volumes of gas and air can be very closely regulated; and hence the relative temperatures in the gas and air sections of the recuperator can be determined to a nicety in accordance with the best operating conditions of the furnace. The embodiment of the dampers 16 and 17 are features of peculiar serviceability in a device of this character, inasmuch as in the event of the recuperators on one end becoming unfit for service, said dampers can be entirely closed, and the gas admission to the injured side shut off, thus throwing that end of the furnace out of commission. If, therefore, under these conditions, the vertical opening on the injured side be temporarily closed, and the passages through the galleries 5 and 6 on that end be likewise closed the furnace can be continued in operation from the other end.

In the form of furnace shown in Figs. 10 to 14 it is obvious that a pair of currents will be formed along each side of the furnace thus providing a more direct course for the heating currents and a consequent higher efficiency. In this form with the partition member in place as shown in Fig. 14 outlet $2^b$ will communicate only with passages 5 and outlet $2^a$ will communicate only with passages 6. In the event that only one side of the furnace is to be used the inlets and outlet on the other side may be bricked up and the partition member 40 removed.

It will be appreciated that according to the principles of the present invention, the furnace disclosed in the specification and drawings is adapted to be constructed for the burning of oil, natural gas, or producer gas, without variation in the construction of the furnace proper, and therefore, this furnace can be modified for changing from one fuel to another merely by embodying the necessary devices for introducing the desired fuel into the furnace; as for example, should natural gas or oil be used for a fuel, the oil and gas can be introduced through the crown or rear wall of chamber 23, see Fig. 1. If it be desired, both recuperators can be used for recuperating air. Furthermore, should one side of the recuperator be put out of commission, the furnace can be held on one side while the damaged side is being repaired. It will be appreciated that this is of great importance inasmuch as with a regenerative furnace, if one side becomes disabled, the entire furnace must be shut down.

I claim:

1. In a glass furnace, side, end, top and bottom walls inclosing a substantially rectangular hearth chamber, said end walls being provided with mixing chambers therein and burner openings leading from said mixing chambers to said hearth chamber, said furnace being provided with gas and air supply ducts leading to said mixing chambers, the bottom wall of said hearth chamber being provided with a substantially centrally located down-draft opening.

2. In a glass furnace, side, end, top and bottom walls inclosing a substantially rectangular hearth chamber, said end walls being provided with mixing chambers therein and burner openings leading therefrom, said furnace being further provided with gas and air supply ducts leading to said mixing chambers, said gas and air ducts being in communication adjacent their communication with said mixing chambers whereby air and gas delivered through said ducts will be commingled when entering said mixing chamber, said bottom wall of said hearth chamber being provided with a substantially centrally located down-draft opening whereby the heating gas delivered by said burner openings may be discharged through said discharge opening.

3. In a glass furnace, side, end, top and bottom walls inclosing a substantially rectangular hearth chamber, each of said end walls being provided with a plurality of mixing chambers therein together with burner openings leading therefrom to said hearth chamber, said furnace being provided with gas and air ducts, said bottom wall of said hearth chamber being provided with a substantially centrally located down-draft opening coacting with said burner openings to establish heating currents from each end of said hearth chamber toward the center thereof.

4. In a glass furnace, side, end, top and bottom walls inclosing a substantially rectangular hearth chamber, said end walls being provided with mixing chambers therein and burner openings leading from said mixing chambers to said hearth chamber, said furnace being provided with gas and air supply ducts leading to said mixing chambers, the bottom wall of said hearth chamber being provided with a substantially centrally located down-draft opening, said furnace being provided with a deflecting wall located beneath said discharge opening and serving to divide the gas discharged through said opening.

5. In a glass furnace, side, end, top and bottom walls inclosing a substantially rectangular hearth chamber, said end walls being provided with mixing chambers therein and burner openings leading from said mixing chambers to said hearth chamber, said furnace being provided with gas and air supply ducts leading to said mixing chambers, the bottom wall of said hearth chamber being provided with a substantially centrally located down-draft opening, said furnace being provided with a deflecting wall located beneath said discharge opening and serving to divide the gas discharged through said opening, dividing walls extending from said deflecting wall and serving to further divide the discharged gas.

In testimony whereof, I have subscribed my name.

ROBERT H. MILLER.

Witnesses:
JOHN H. FISSE,
F. JULIUSON.